United States Patent
Schlieber et al.

(10) Patent No.: US 6,900,769 B2
(45) Date of Patent: May 31, 2005

(54) BODYWORK PART WITH INTEGRATED ANTENNA

(75) Inventors: Frank Schlieber, Burgbrohl (DE); Ralf Vogt, Wissen/Schönstein (DE); Klaus-Erik Schmid, Kirchheim (DE); Reinhard Jakobi, Maxdorf (DE)

(73) Assignees: Montaplast GmbH, Morsbach (DE); DaimlerChrysler AG, Stuttgart (DE); BASF AG, Ludwigshafen (DE)

( * ) Notice: Subject to any disclaimer, the term of this patent is extended or adjusted under 35 U.S.C. 154(b) by 0 days.

(21) Appl. No.: 10/455,107

(22) Filed: Jun. 5, 2003

(65) Prior Publication Data

US 2004/0036658 A1 Feb. 26, 2004

Related U.S. Application Data

(63) Continuation of application No. PCT/EP01/13994, filed on Nov. 30, 2001.

(30) Foreign Application Priority Data

Dec. 5, 2000 (DE) .......................................... 100 60 603

(51) Int. Cl.$^7$ ................................................. H01Q 1/32
(52) U.S. Cl. ..................................... 343/713; 343/873
(58) Field of Search ................................ 343/711, 712, 343/713, 872, 873

(56) References Cited

U.S. PATENT DOCUMENTS

| 4,758,166 | A | | 7/1988 | Bonnett et al. |
| 5,682,168 | A | | 10/1997 | James et al. |
| 5,825,096 | A | | 10/1998 | Morimoto et al. |
| 5,926,142 | A | | 7/1999 | Rathgeb et al. |
| 6,351,242 | B1 | * | 2/2002 | Hesker ........................ 343/713 |
| 6,433,749 | B1 | * | 8/2002 | Thompson .................. 343/713 |

FOREIGN PATENT DOCUMENTS

| DE | 195 35 250 A1 | 3/1997 | |
| DE | 196 53 431 A1 | 7/1997 | |
| DE | 19636477 C2 | 3/1998 | |
| DE | 197 29 403 A1 | 2/1999 | |
| DE | 200 09 531 U1 | 10/2000 | |
| EP | 1 087 464 A2 | 3/2001 | |
| JP | 07131224 A * | 5/1995 | ............ H01Q/1/32 |
| WO | WO 97/41618 A1 | 11/1997 | |

* cited by examiner

*Primary Examiner*—Shih-Chao Chen
(74) *Attorney, Agent, or Firm*—Akin Gump Strauss Hauer & Feld, LLP

(57) ABSTRACT

A bodywork part (2) is provided with an integrated antenna arrangement (4) and with a carrier unit (8) on which the antenna arrangement (4) is detachably arranged. This construction permits an antenna to be integrated and replaced easily.

11 Claims, 2 Drawing Sheets

BODYWORK PART WITH INTEGRATED ANTENNA

CROSS-REFERENCE TO RELATED APPLICATIONS

This application is a continuation of International Application No. PCT/EP01/13994, filed Nov. 30, 2001, which was published in the English language on Jun. 13, 2002, under International Publication No. WO 02/47198 A2 and the disclosure of which is incorporated herein by reference.

BACKGROUND OF THE INVENTION

The invention relates to a bodywork part, in particular a vehicle bodywork part, with an antenna integrated therein.

A vehicle has various antennas for various communications devices, for example radio, mobile radio or navigation systems. Radio antennas are embodied, for example, as window pane antennas. Such a window pane antenna is described, for example, in German Patent DE 44 15 675 C1. A rod antenna is usually used as a mobile radio antenna. Furthermore, German published patent application DE 42 15 659 A1 describes an antenna which is integrated into the bumper of the vehicle. As the number of communications services available in a vehicle increases, the number of antennas also increases. The number of antennas fitted on a vehicle is limited in this context. With integrated antennas there is the disadvantage that they are usually permanently integrated into the window-pane glass or into foam so that it is not possible to replace them.

BRIEF SUMMARY OF THE INVENTION

The invention is therefore based on the object of providing a bodywork part which permits an antenna to be integrated and replaced in a particularly easy way.

The object is achieved according to the invention by means of a bodywork part with an antenna arrangement integrated therein and with a carrier unit on which the antenna arrangement is detachably arranged. The advantages achieved with the invention lie, in particular, in the fact that the antenna arrangement can be inserted, together with the carrier unit, through cavities formed in the bodywork part, without further expenditure, in particular without additional shelf removal operations or cutting-out operations. In particular, the loss of rigidity of the bodywork caused by cutting-out operations is largely avoided by using the carrier unit and by its arrangement in cavities of the bodywork. In addition, such an antenna arrangement which is integrated into the bodywork part in a concealed fashion is not visible to the outside. This largely avoids the antenna arrangement being damaged by external influences. The detachable arrangement of the antenna on the carrier unit makes refitting and retrofitting, as well as complete replacement of individual antennas or of a plurality of antennas for different applications, possible in a particularly easy way. The cabling expenditure is kept particularly low. The antenna arrangement is prefabricated as a module and arranged on the carrier unit so that complex mounting operations are dispensed with. Furthermore, the antenna arrangement is integrated at a height which is sufficient for good reception, for example in the roof or in the tailgate of a vehicle. Furthermore, the cavities of the bodywork parts of the vehicle provide a particularly large installation space for the antenna arrangement.

The antenna arrangement expediently comprises a multiplicity of antenna modules. In this way, a plurality of antenna modules can be used for different radio services, for example mobile radio, radio (terrestrial or satellite-supported), short range communication system (SRC). Depending on the requirements, the antenna modules can be pre-mounted in a modular fashion. In such a case, the operational capability of an antenna arrangement which is fabricated in such a way can be checked completely even before installation in the vehicle, in particular in the bodywork part provided for that purpose. Moreover, this permits common integration of antenna modules which radiate horizontally and/or vertically. The cabling and conductor structure and the earth reference connection are predefined by such a modular design with pre-definable antenna modules, so that the individual antenna modules can be inserted into the carrier unit in a prefabricated form. As a result, only the carrier unit with the antenna modules already inserted has to be attached in the final mounting, as a result of which the final mounting times are significantly reduced.

The carrier unit is preferably formed from an electrically non-conductive material. The carrier unit is embodied, for example, as an injection-molded or pressure-molded part. In order to receive the antenna arrangement, the carrier unit has at least one opening. Depending on the type and embodiment of the antenna arrangement, the carrier unit is prefabricated with corresponding cut-outs or openings or provided with corresponding conductor structures which themselves form an antenna module. The antenna arrangement is thus pre-mounted in its entirety before installation in the vehicle on the carrier unit.

For the most satisfactory degree of rigidity possible, the carrier unit has reinforcing ribs. The carrier unit is provided, for example, with transverse ribbing which ensures particularly high rigidity. A profile frame is preferably provided for receiving the carrier unit. Such a frame construction permits, in a supplementary fashion, a high degree of rigidity of the entire arrangement in the bodywork part with a simultaneously largely lightweight construction.

The carrier unit is expediently detachably arranged in a frame opening of the profile frame. The frame opening surrounds the carrier unit in a positively locking fashion. As a result, a particularly high degree of tensile strength and rigidity is provided, particularly in crash situations. Depending on the type and embodiment of the profile frame, one or more carrier units can be arranged horizontally and/or vertically therein. As a result, in addition to satellite-supported and/or terrestrial radio antennas, the use of navigation systems with related radar systems is made possible, in particular with a vertical arrangement.

The profile frame is advantageously formed from a metal. The profile frame is formed from a lightweight metal, for example aluminum. As a result, the profile frame serves as an earth reference connection for the antenna arrangement. Furthermore, owing to its frame design, the profile frame contributes largely to the rigidity of the bodywork.

An outer shell which is permeable to electromagnetic waves is advantageously provided as a bodywork part. The outer shell is preferably formed from plastic, in particular from glass-fiber-reinforced thermoplastic. The profile frame with the carrier unit is arranged in the outer shell, in a lid, in a roof or in a bonnet of the vehicle. The result of the compact design of the modular antenna arrangement with carrier unit and profile frame is that it can be attached between the outer shell (referred to as paneling, for short) and the inner shell as well as between the hinge and the lock. Here, the profile frame forms a tensile assembly between the lock and the hinge. In the event of a crash involving large plastic deformations, the tensile assembly is preserved. The outer shell which is formed from plastic serves as a dielectric of the antenna arrangement, the carrier unit as a carrier structure and the profile frame as an earth reference connection.

Furthermore, the carrier unit is formed from plastic and has an electrically insulating effect with respect to other metallic bodywork parts. Depending on the type and embodiment of the bodywork part, it preferably has an inner shell, which is of metallic construction, towards the interior of the vehicle. As a result, electromagnetic radiation into the interior of the vehicle is reliably avoided. The inner shell completely covers the frame opening which surrounds the antenna arrangement. The outer shell and the inner shell are preferably parts of a door, of a boot lid, of a roof, of a wing and/or of a bonnet. The antenna arrangement is arranged here in particular in a bodywork part facing away from the engine.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

Parts which correspond to one another are provided with the same reference numerals in all the Figures.

DETAILED DESCRIPTION OF THE INVENTION

Figure 1:
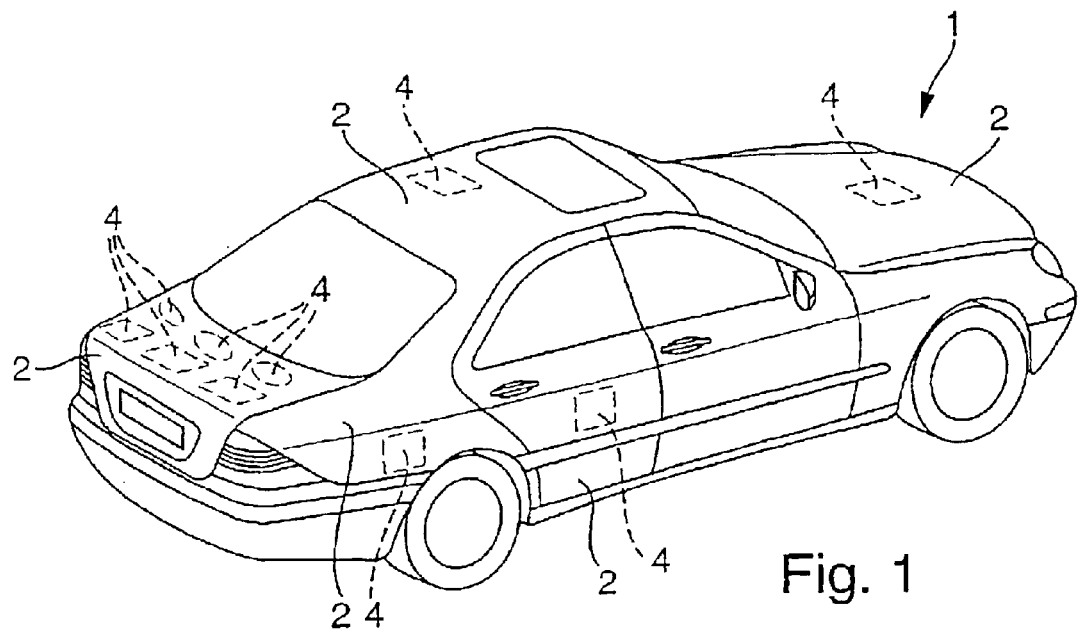
FIG. 1 is a schematic perspective view of a vehicle with a bodywork part with an integrated antenna arrangement.

FIG. 1 illustrates a vehicle 1. The vehicle 1 has various bodywork parts 2 which are suitable for integrating an antenna arrangement 4. A part of a door, of a trunk lid, of a roof, of a fender, and/or of a hood, for example, serves as the bodywork part 2. The bodywork part 2 is permeable to electromagnetic waves. The bodywork part 2 is preferably formed from plastic, in particular from glass-fiber-reinforced thermoplastic, which is distinguished by particularly good rigidity, low anisotropy and particularly low longitudinal expansion at high temperatures and has little influence on the crash behavior as a result of thermal aging.

In particular, the outer paneling or outer shell of the bodywork part 2 is formed from a film in order to achieve the permeability to electromagnetic waves, and from a fiber-reinforced plastic material which is connected to this film by means of in-mold coating in an injection molding, compression molding or stamping process.

Possible films are single-layer, two-layer or multi-layer films. Use is preferably made of two-layer films or multi-layer films, i.e. composite films. Suitable single-layer films are formed, for example, from mixtures of polyamides and polyethylene ionomers, for example ethylene/methacrylic acid copolymers containing, for example, sodium, zinc and/or lithium counter-ions (available inter alia under the trademark Surlyn® from duPont) or from copolyesters. Composite films which are composed of at least one substrate layer, optionally at least one intermediate or decorative layer, and at least one transparent outer layer, in this order, are particularly suitable. For the sake of clarity, these layers are not illustrated in the Figures.

The substrate layer typically contains ASA polymers, ABS polymers, polycarbonates, polyesters such as polyethylene terephthalate or polybutylene terephthalate, polyamides, polyether imides, polyether ketones, polyphenylene sulphides, polyphenylene ethers, or mixtures of these polymers. ASA polymers are preferably used for the substrate layer. Furthermore, use is preferably made of blends made of ASA and/or ABS polymers and polycarbonates.

ASA polymers are generally understood to be impact-modified styrene/acrylonitrile polymers in which there are graft copolymers of vinylaromatic compounds, in particle styrene, and vinyl cyanides, in particular acrylonitrile, or polyalkyl acrylate rubbers in a copolymer matrix made, in particular, of styrene and acrylonitrile. ASA polymers are commercially available under the trademark Luran® S (from BASF) for example.

Suitable polycarbonates are known per se. Particularly preferred polycarbonates are those based on bisphenol A or bisphenol A together with up to 80mol% of further aromatic dihydroxyl compounds. The polycarbonates Makrolon® (from Bayer) and Lexan® (from GE Plastics) are commercially available, for example. Copolycarbonates based on bisphenol A and, for example, bis(3,5-dimethyl-4-hydroxyphenyl) sulphone and/or 1,1-di(4-hydroxyphenyl)-3,3,5-trimethylcyclohexane, which are distinguished by a high degree of heat resistance, may also be used. The last-mentioned copolycarbonate is commercially available under the trademark Apec®HT (from Bayer). The polycarbonates can be used either as regrind or in pelletized form. They are typically present in the ASA substrate layer in quantities of from 0 to 50% by weight with respect to the entire molding material. The addition of polycarbonates leads, inter alia, to higher thermal stability and improved cracking resistance of the composite films.

Instead of ASA polymers or blends thereof with polycarbonates, or even in addition thereto, the substrate layer can also be constructed from ABS polymers (these are, inter alia, impact-modified styrene/acrylonitrile polymers in which graft copolymers of styrene and acrylonitrile are present on polybutadiene rubbers in a copolymer matrix made of styrene and acrylonitrile; Terlux® (from BASF), polycarbonates, polyesters such as polybutylene terephthalate (PBT) (for example Ultradur® from BASF) or polyethylene terephthalate (PET), or polyamides (Ultramid® from BASF). The abovementioned polymer materials are generally known, for example from H. Domininghaus, "*Die Kunststoffe und ihre Eigenshaften*" [Plastics and their Properties], VDI-Verlag, Dusseldorf (1992).

The substrate layer can also contain, as additives, such compounds as are typical and customary for the (co) polymers described and their mixtures. Examples of additives are: cotorants, pigments, effect colorants, antistatic materials, antioxidants, stabilizers for improving the thermal stability, for increasing the light stability, and for raising the resistance to hydrolysis and the resistance to chemicals, means for counteracting thermal decomposition, and, in particular, lubricants which are expedient for manufacturing molded elements or parts.

The thickness of the substrate layer is preferably about 100 to 2000 μm, in particular about 150 to 1500 μm, and particularly preferably about 200 to 1000 μm.

The composite films may also have an intermediate layer made of thermoplastic and/or thermosetting plastic, optionally with further additives. The intermediate layer is also used as a color layer or decorative layer. Suitable thermoplastics are, for example, the polyalkyl and/or polyaryl esters of (meth)acrylic acid, also in impact-modified form, poly(meth)acrylamides or poly(meth)acrylonitrile, acrylic resins, ABS polymers, styrene/acrylonitrile polymers (SAN), polycarbonates, polyesters, for example polyethylene or polybutylene terephthalate, polyamides, in particular amorphous polyamide, for example polyamide 12, polyether sulphones, thermoplastic polyurethanes, polysulphones, polyvinyl chloride, or ASA polymers. Blends of the above (co)polymers are also suitable, for example mixtures of ASA polymers and polycarbonates as described above for the substrate layer. Possible thermosetting plastics are polyurethane foams. Use is preferably made of acrylic resins and/or styrene (co)polymers.

The intermediate layer is preferably made of impact-resistant polymethyl methacrylates (POMMA), polycarbonates or the ASA polymers described above for the substrate layer or blends thereof with polycarbonates. Suitable impact-modified poly(meth)acrylates are described, for example, in M. Stickler, T. Rhein in *Ullmann's Encyclopedia of Industrial Chemistry*, Vol. A21, pages 473–486, VCH Publishers, Weinheim (1992), and H. Domininghaus, *Die Kunststoffe und ihre Eigenschaften* [Plastics and their Properties], VDI-Verlag, Dusseldorf (1992). Polymethyl methacrylates are, above all, known to the person skilled in the art and are available, for example, under the trademarks Lucryl® (BASF AG) and Plexiglas® (Rohm GmbH).

The intermediate layer has effect colorants as its decorative layer. These are, for example, colorants, metal flakes or pigments. Possible colorants or pigments are organic or inorganic compounds. Organic pigments which may be mentioned are brightly colored pigments, white pigments and black pigments (colored pigments), and liquid crystal pigments. Colored pigments and gloss pigments and the inorganic pigments, which are usually used as fillers, are likewise suitable as inorganic pigments.

The layer thickness of the decorative layer is generally in the range of about 10 to 1000 µm, preferably about 50 to 500 µm and particularly preferably about 100 to 400 µm.

The outer layer is generally translucent, preferably transparent. It is composed of poly(meth)acrylate polymers, impact-resistant poly(meth)acrylate, in particular impact-resistant polymethyl methacrylate, fluoro(co)polymers such as polyvinylidene fluoride (PVDF), ABS polymers, polycarbonates, polyethylene terephthalate, amorphous polyamide, polyether sulphones, polysulphones, SAN copolymers, or mixtures thereof. In particular, the outer layer contains polymethyl methacrylate, impact-resistant polymethyl methacrylate or polycarbonates, preferably polymethyl methacrylate, impact-resistant polymethyl methacrylate, PVDF, or mixtures thereof. The polymers and/or mixtures thereof are, as a rule, selected in such a way that they lead to a transparent outer layer.

Furthermore, an adhesive layer composed of an adhesion promoter with a layer thickness generally of about 5 to 400 µm, in particular about 5 to 100 µm, can adjoin the outer face of the substrate layer. The adhesion promoter is used to produce a fixed connection to a selected substrate which comes to rest under the substrate layer (for example by in-mold coating in an injection molding process). The adhesive layer is then used if the adhesion between this further substrate and the substrate layer is inadequate (for example in the case of polyolefin substrates). Suitable adhesion promoters are known to the person skilled in the art. Examples of suitable adhesion promoters are ethylene/vinyl acetate copolymers for coupling to polyethylene and maleic anhydride-grafted polypropylene for coupling to polypropylene. The current view is that in both cases the adhesion is achieved by introducing polar groups into the non-polar polyolefins.

The composite films are manufactured, inter alia, by adapter or die coextrusion of the components, preferably in a single-stage process. Die coextrusion is explained, for example, in European published patent application EP-A20 225 500, and the adapter coextrusion method is explained in the Proceedings of the Conference on Extrusion Technology *"Coextrusion of Films"*, VDI-Verlag, Dusseldorf (Oct. 8/9, 1996), in particular in the paper by Dr. Netze. Furthermore, the composite films can be manufactured by laminating the individual film layers onto one another in a heatable gap. A three-layer film can, however, also be largely manufactured from a composite film composed of the two layers, intermediate layer (or decorative layer) and cover layer, by subsequently providing the latter with the substrate layer.

The manufacture of the outer shells made of film and plastic material is carried out according to known methods. As a rule, composite films are preformed with the three-layer structure composed of substrate layer, intermediate layer and outer layer and/or the two-layer structure composed of substrate layer and outer layer by means of thermoforming.

The outer shells are then obtained by in-mold coating in an injection molding, compression molding or stamping process, to provide the composite films with a fiber-reinforced plastic material. Thermoplastic molding materials based on ASA, ABS or SAN polymers, poly(meth)acrylates, polyether sulphones, polybutylene terephthalate, polycarbonates, polypropylene (PP) or polyethylene (PE), and blends of ASA or ABS polymers and polycarbonates or polybutylene terephthalate and blends of polycarbonates and polybutylene terephthalates are preferably used as the plastic materials. The aforesaid plastic materials can have further customary auxiliaries and fillers. Such materials are, for example, lubricants, demolding agents, waxes, pigments, colorants, flame retardants, antioxidants, and stabilizers for counteracting the effect of light or antistatic agents.

The plastic material, which in accordance with the method according to the invention is used for in-mold coating in an injection molding process, generally has fibers in a quantity of about 3 to 40% by weight. Hydrocarbon fibers, aramid fibers or glass fibers, staple or fiberglass rovings are examples of fibrous fillers. Glass fibers are particularly preferred. Furthermore, natural fibers such as flax, hemp, jute, sisal, ramie, or carnaf can be used as fibers.

The glass fibers which are used can be made of E, A or C glass and are preferably provided with a size and/or an adhesion promoter. Their diameter is generally about 6 and 30 µm. Both rovings and staple fibers with a length of about 1 to 30 mm can be used.

Figure 2:
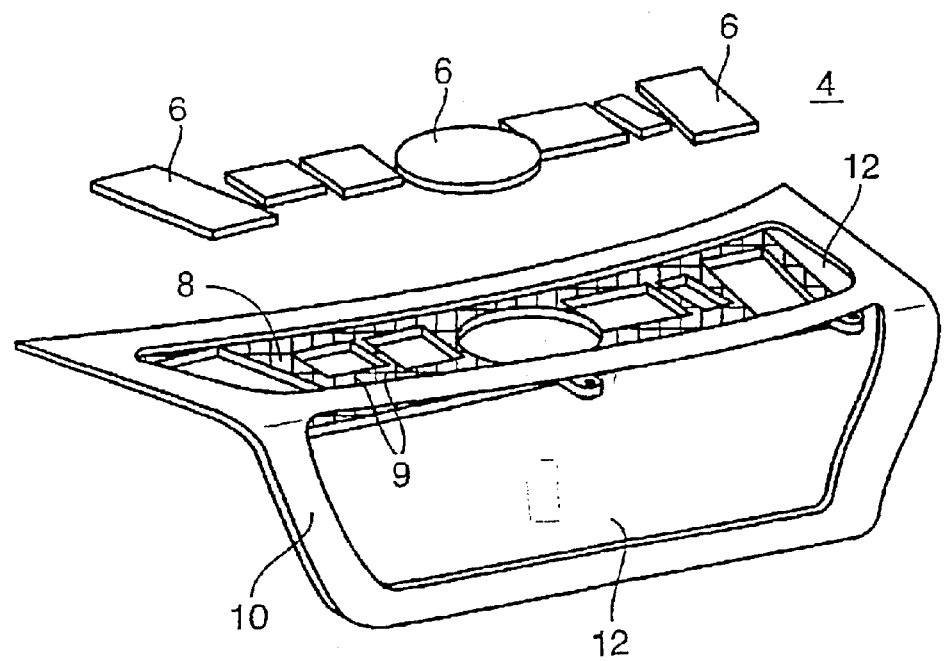
FIG. 2 is a schematic perspective view of the antenna arrangement with a number of antenna modules.

FIG. 2 shows the antenna arrangement 4, which comprises a multiplicity of antenna modules 6. Various antenna types for various radio services, for example mobile radio, radio, television, are provided as antenna modules 6. Depending on the application, the antenna modules 6 are embodied differently, for example as a conductor structure or as a semiconductor. The antenna arrangement 4 with the antenna modules 6 is detachably arranged in a carrier unit 8. The carrier unit 8 is formed from an electrically non-conductive material, for example plastic, and is used as an insulator for the antenna arrangement 4. To provide particularly good rigidity, the carrier unit 8 has reinforcing ribs 9.

In order to receive the carrier unit 8, a profile frame 10 in which the carrier unit 8 is detachably arranged in a frame opening 12 is provided. The profile frame 10 can be part of the bodywork part 2, for example the carrier structure or an inner part. The profile frame 10 is partially formed from a metal, in particular a lightweight metal, for example aluminum, and/or a plastic. The profile frame 10 is in particular embodied as a pipe. The profile frame 10 serves as a mass reference connection for the antenna arrangement 4. Depending on the type and embodiment of the bodywork part 2, the respective profile frame 10 is constructed so as to be flattened in the horizontal direction and/or in the vertical direction. In FIG. 2, the antenna arrangement 4 is arranged, by way of example, in the frame opening 12 of the horizontal face. Alternatively or in addition, a further antenna arrangement 4 can be arranged in the frame opening 12 of the vertical face. Depending on the antenna function, corresponding antenna modules 6 with a horizontal radiation characteristic and/or vertical radiation characteristic can thus be used. The frame opening 12 surrounds the carrier unit 8 in a positively locking fashion. The carrier unit 8 is preferably attached to the profile frame 10 by attachment means, for example clamping or clipping devices.

Figure 3:
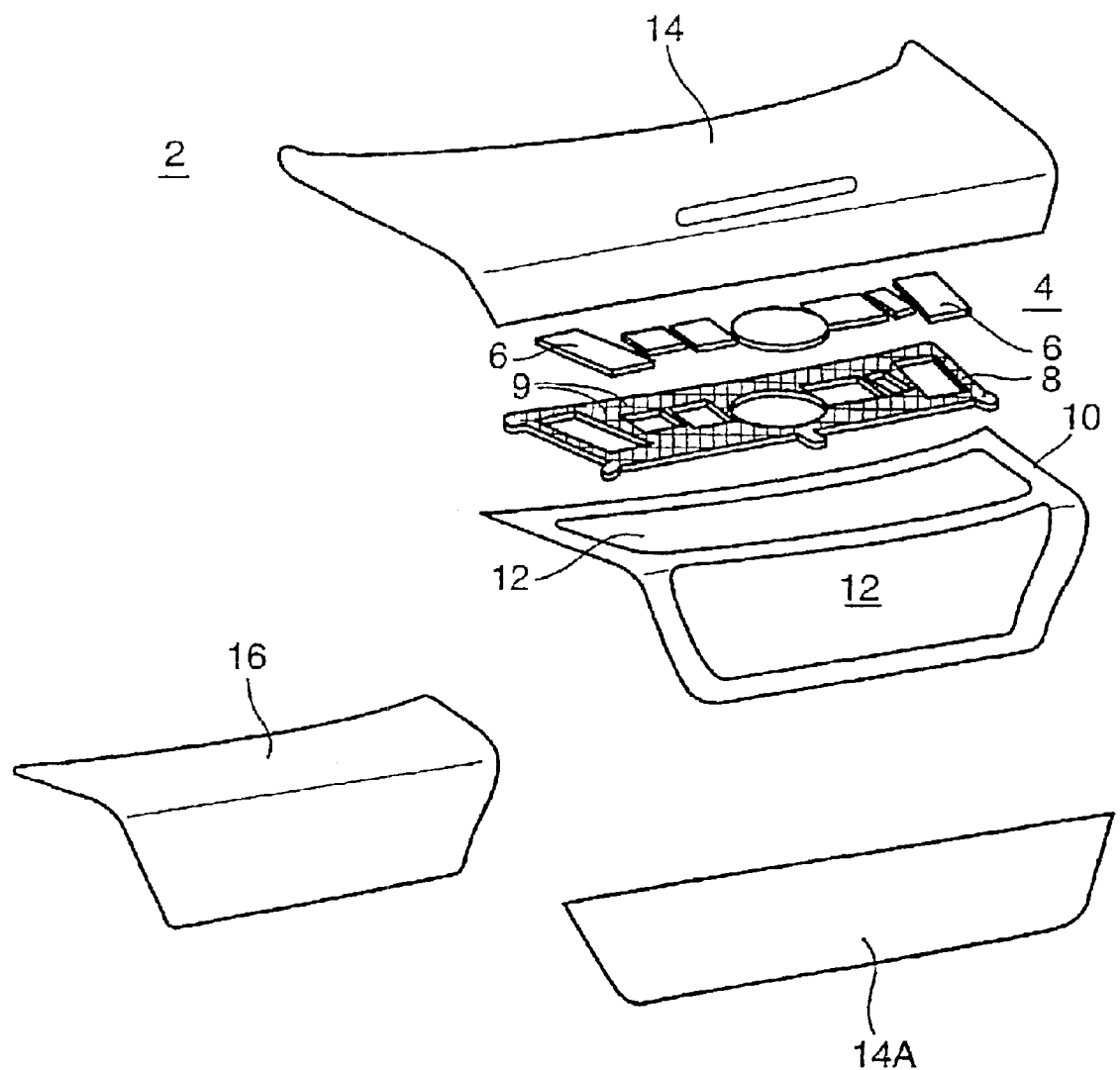
FIG. 3 is a schematic perspective view of the bodywork part, in particular of a tailgate, with the integrated antenna arrangement.

The integration of the antenna arrangement 4 in a bodywork part 2 embodied as a tailgate is illustrated, by way of example, in FIG. 3. The bodywork part 2 comprises an outer shell 14 and an inner shell 16. Depending on the type and embodiment of the vehicle, the outer shell 14 and/or the inner shell 16 are of multi-part construction. As shown in FIG. 3, the outer shell 14 is of two-part construction and comprises an identifier cavity 14A. The inner shell 16 is of single-part construction in FIG. 3. The inner shell 16 is of metallic construction towards the interior of the vehicle and virtually completely covers the frame opening 12 of the profile frame 10. This provides electromagnetic wave shielding in the passenger area. Alternatively or in addition, the carrier unit 8 can be of metallic construction towards the interior of the passenger compartment. Furthermore, the inner shell 16 surrounds the profile frame 10 in a positively locking fashion. The profile frame 10 is detachably connected to the bodywork part 2 in a fashion which is not illustrated in more detail. When the profile frame 10 is eliminated, the carrier unit 8 can be alternatively removed from the inner shell 16.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A bodywork part (2) comprising an antenna arrangement (4) integrated in the bodywork part and a carrier unit (8) comprising electrically non-conductive material on which the antenna arrangement (4) is detachably arranged, and further comprising a profile frame (10) for receiving the carrier unit (8), wherein the carrier unit (8) is detachably arranged in a frame opening (12) of the profile frame (10).

2. The bodywork part according to claim 1, wherein the antenna arrangement (4) comprises a plurality of antenna modules (6).

3. The bodywork part according to claim 1, wherein the carrier unit (8) has reinforcing ribs (9).

4. The bodywork part according to claim 1, wherein the frame opening (12) surrounds the carrier unit (8) in a positively locking fashion.

5. The bodywork part according to claim 1, wherein the profile frame (10) comprises a metal.

6. The bodywork part according to claim 1, further comprising an outer shell (14, 14A) which is permeable to electromagnetic waves.

7. The bodywork part according to claim 6, wherein the outer shell (14, 14A) comprises a plastic.

8. The bodywork part according to claim 6, further comprising an inner shell (16) which is of metallic construction toward an interior of the vehicle.

9. The bodywork part according to claim 8, wherein the inner shell (16) covers the frame opening (12).

10. The bodywork part according to claim 8, wherein the outer shell (14, 14A) and the inner shell (16) are parts of a door, a trunk lid, a roof, a fender, and/or a hood.

11. A bodywork part (2) comprising an outer shell (14, 14A) made of plastic, which is permeable to electrical magnetic waves, and a carrier unit (8) comprising an electrically non-conductive material on which the antenna arrangement (4) is detachably arranged, and further comprising a profile frame (10) for receiving the carrier unit, wherein the carrier unit (8) is detachably arranged in a frame opening (12) of the profile frame (10).

* * * * *